INVENTOR.
ERNEST H. GATZERT
BY
Henry H. Gage
AGENT

Jan. 29, 1963 E. H. GATZERT 3,076,179

DATA TRANSMISSION SYSTEM

Filed June 30, 1958

5 Sheets-Sheet 3

Jan. 29, 1963 E. H. GATZERT 3,076,179

DATA TRANSMISSION SYSTEM

Filed June 30, 1958 5 Sheets-Sheet 5

3,076,179

DATA TRANSMISSION SYSTEM

Ernest H. Gatzert, Rochester, N.Y., assignor to General Dynamics Corporation, Rochester, N.Y., a corporation of Delaware Filed June 30, 1958, Ser. No. 752,390
4 Claims. (Cl. 340—172.5)

Figure 1:
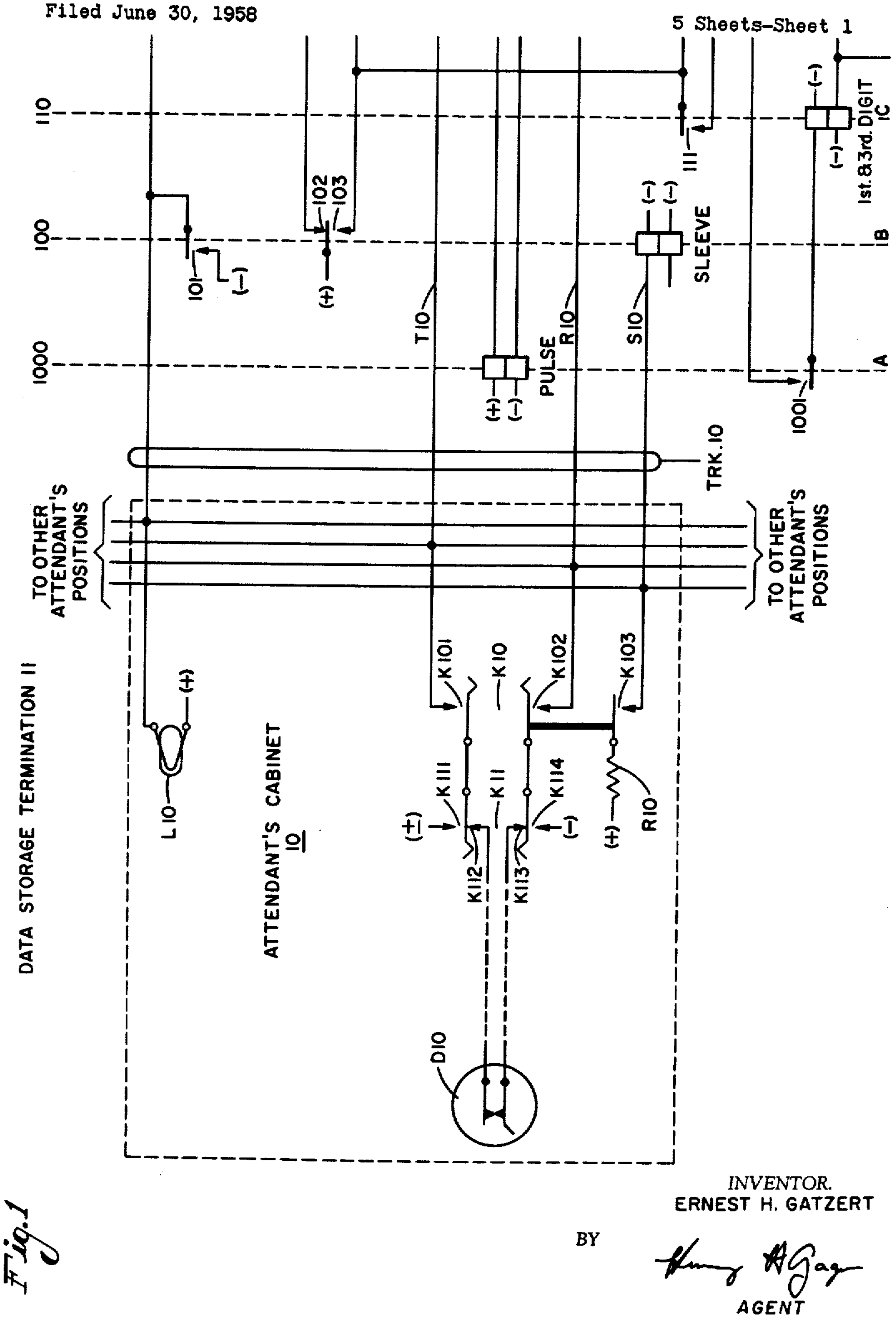
Figure 2:
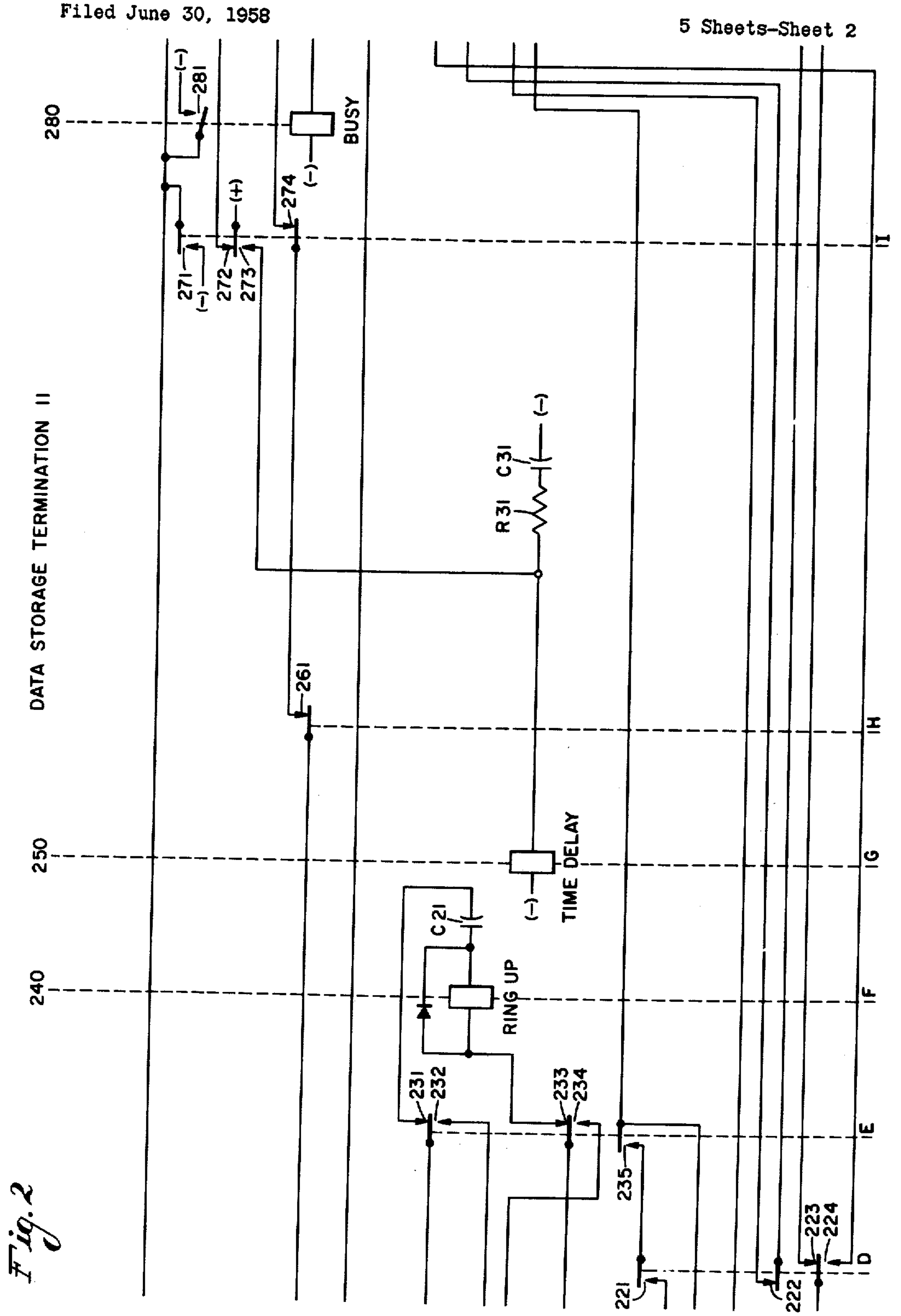
Figure 3:
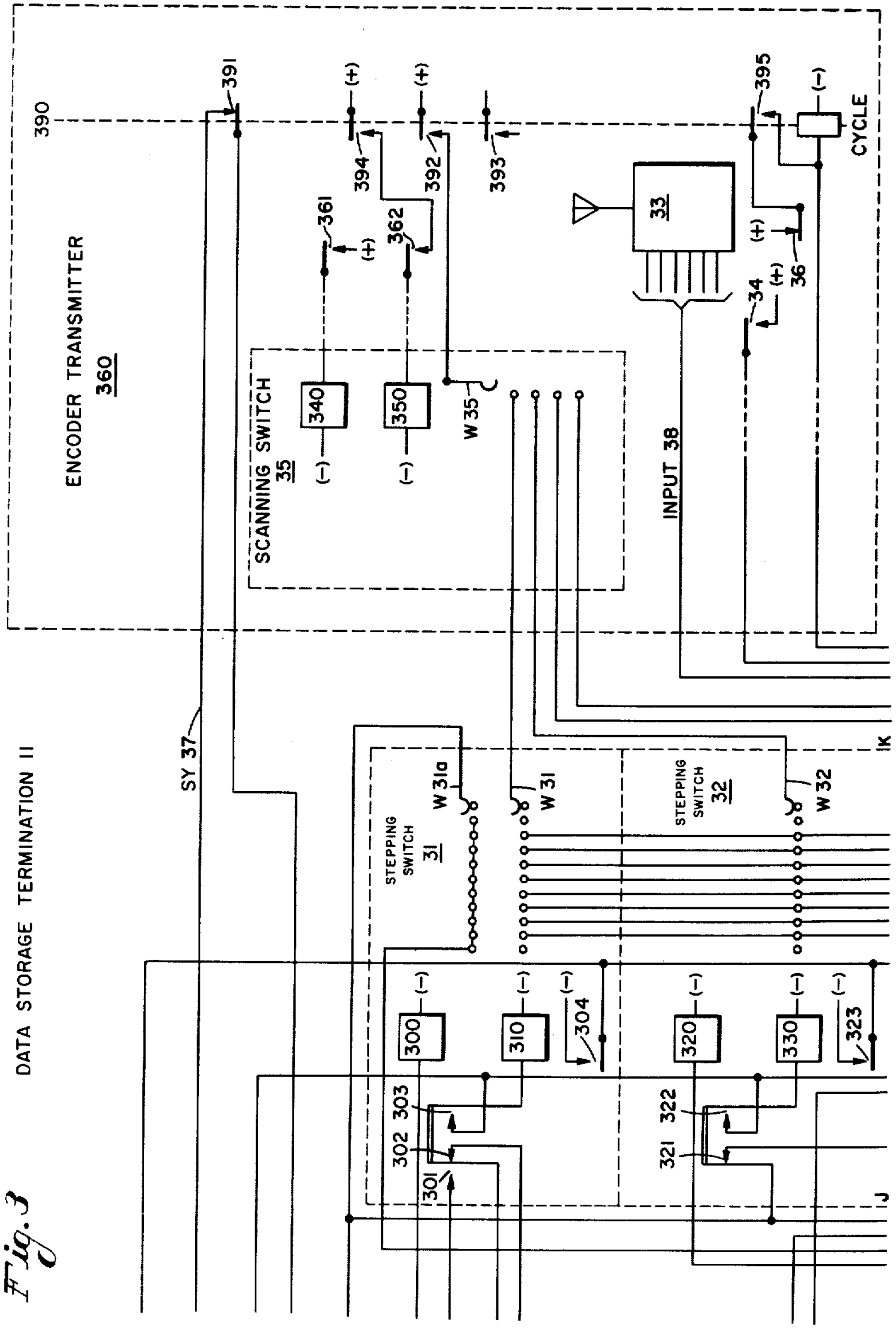

My invention relates generally to systems for transmitting encoded data from point to point and more particularly to systems for transmitting digital information from an attendant's position to the encoder of a broadcast paging system.

In the past, broadcast paging systems have been provided wherein a transmitter is manually and directly controlled by an attendant. As a result, the transmitter is made effective to broadcast encoded signals to a plurality of stations and energize signaling apparatus at a particular one of these stations. Because such a transmitter and its manual control apparatus are necessarily bulky, it may be inconvenient to locate the equipment at a telephone attendant's cabinet when such an attendant is to have control of the paging system.

Accordingly, it is an object of my invention to provide a new and improved data transmission system.

Another object of my invention is to provide a new and improved data transmission system for use with a broadcast paging system.

Another object of my invention is to provide a new and improved system for giving an attendant at a cabinet control over a broadcast paging transmitter located remote from the cabinet.

Another object of my invention is to provide a new and improved storage system capable of multiple readout operations after data has been stored therein.

Another object of my invention is to provide a new and improved data storage or registering system for controlling a broadcast paging transmitter wherein an attendant may cause the broadcast transmitter to be operated upon the transmission and storage of data in the registering apparatus and thereafter cause the transmitter to be reoperated without further operating the data storage apparatus.

I accomplish these and other objects in a system having a transmitter for broadcasting selective signals over a communication medium, as well as one or more attendant's cabinets of the well-known telephone type connected to a data storage termination by a line. The cabinet includes a telephone dial and means such as a key connected on one side to a signaling generator for transmitting digital information and other signals, respectively, to the termination. Both signal transmitting means are connected to the line by a key manually controlled by the attendant.

In order to prepare the termination to receive signals from the attendant's cabinet, I provide means in the termination operative in response to the operation of the manually operated connecting key for seizing the termination. The seizing means in operated condition is effective for connecting means for repeating signals from the attendant's dial to the line.

The broadcast transmitter is arranged to be operated in response to a series of directive signals, rather than a single signal. Accordingly, I provide the aforementioned data storing means which includes a group of independently operable stepping switches. These switches have normal positions and each is operative away from normal in response to a corresponding one of a succession of operations of the repeating means, the operated positions assumed by the switches representing the value of the transmitted groups of signals.

The broadcast transmitter has encoding means operative in response to a start signal from the termination for scanning the data storing switches and thus directively operating the broadcast transmitter in accordance with the position assumed by those switches. In order to start the scanning means within the transmitter, I provide means including a start relay which is prepared for operation by the operation of all registering switches. This relay thereafter is operated in response to the receipt of a generator signal supplied by the operation of the signaling key at the attendant's cabinet. The relay in operated condition is effective for transmitting a signal to the encoding means within the broadcast transmitter. Thereupon the information stored within the stepping switches is read out to the broadcast transmitter, which is then selectively energized.

Upon the complete transmission of a single set of signals by the broadcast transmitter, the associated encoding means transmits a stop signal to the data storing termination. The now-operated start relay releases in response to the stop signal. Further operation of the signaling key at the attendant position and the consequent reoperation of the start relay is effective to reoperate the scanning means, so that the transmitter is again energized.

At the conclusion of the signaling operation, the start relay in released condition is effective to prepare a circuit for energizing the stepping switch release magnets. The release magnets' operating circuits are completed by the restoration of the seizing means to normal condition, which occurs when the attendant restores the manually controlled connecting means to its normal condition. The termination is now in idle condition and ready for further use.

Figures 4, 6:
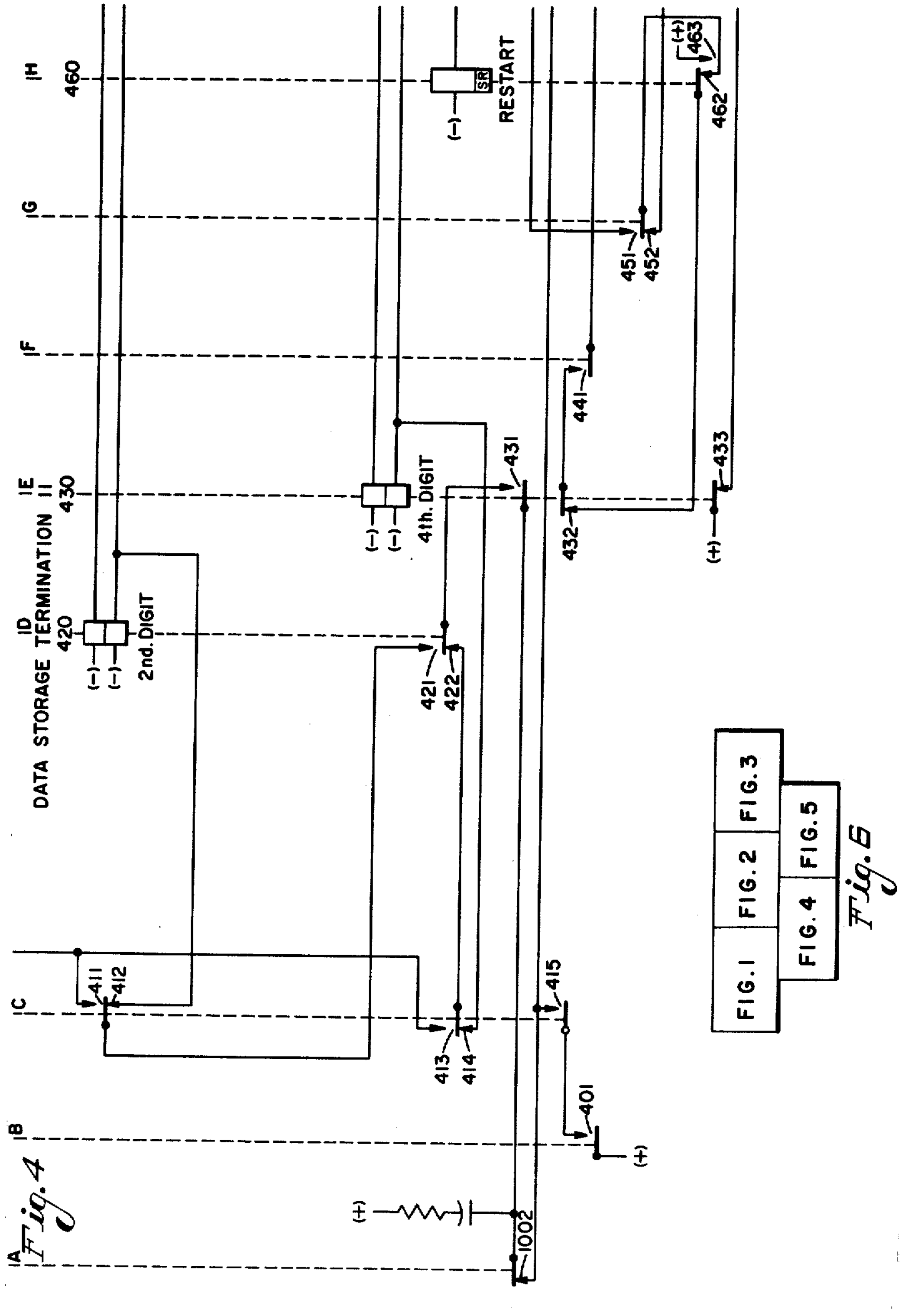
Figure 5:
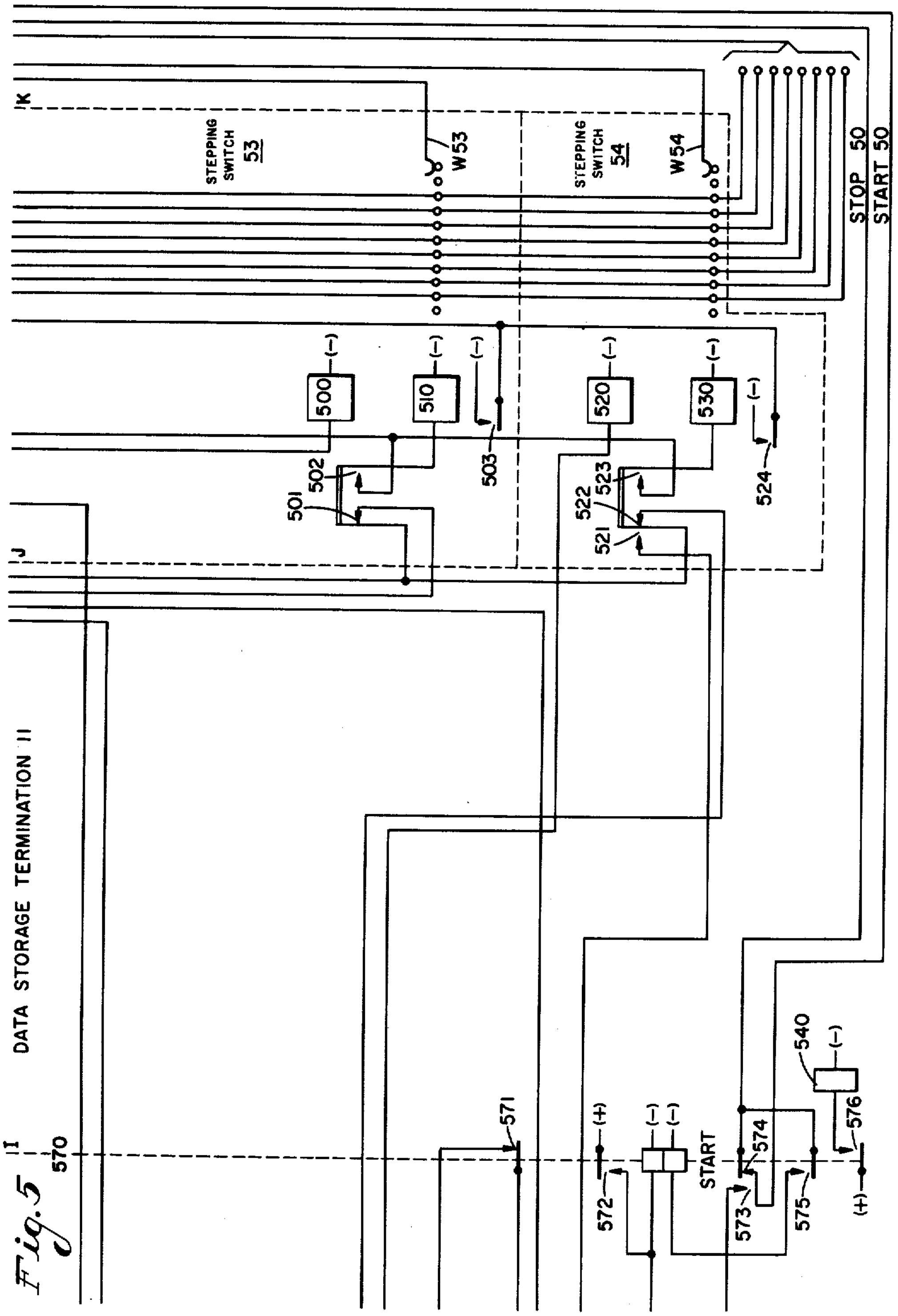

In the detailed description of my invention which follows, reference is made to the drawings attached to and forming a part of the present specification and in which:

FIGS. 1–5 show an attendant's cabinet, a trunk termination, and an encoder transmitter; and FIG. 6 shows the order in which FIGS. 1–5 are to be arranged.

In the description which follows, reference is made to a first power source such as a battery having its positive plate or terminal connected to ground. This most positive plate is referred to hereinafter as "ground" and in the drawings as "+"; similarly, the most negative, ungrounded terminal or plate of the battery is hereinafter referred to as "battery" and in the drawings as "—." A second power source includes a low frequency ringing generator of a type commonly used in connection with telephone apparatus. One side of the ringing generator is connected to ground and is hereinafter referred to in the description as "ground" and in the drawings as "+," while the second, ungrounded side is hereinafter referred to in the description as "ringing generator" and in the drawings as "±."

*Seizing the Termination*

Referring to FIG. 1, a plurality of attendant's cabinets such as 10 are provided. Each cabinet includes a dial such as D10 and signaling key K11 for transmitting direct current impulse train and ground and ringing generator signals over trunk line of TRK10 outgoing from the attendant's cabinets. Means comprising connecting key K10 is provided for connecting both dial D10 and the key K11 to conductors T10 and R10 of trunk TRK10 in an obvious manner when key K10 is operated. Similarly, key K10 in operated condition is effective for applying a resistance ground signal to conductor S10 of trunk TRK10 at make contacts K103 in order to operate over an obvious circuit seizing means including sleeve relay 100 within data storage termination 11.

The operation of relay 100 is effective for completing an obvious energizing circuit for the busy indicating means comprising lamps such as L10 at each attendant cabinet at make contacts 101. The operation of relay 100 is also effective for preparing an impulsing magnet energizing circuit at make contacts 401 which is to be explained presently.

The operation of relay 100 is further effective for operating transfer means including fourth digit relay 430 by completing an operating circuit which is traced from ground through make contacts 103, off-normal contacts 522 of stepping switch 54, and the upper winding of relay 430 to battery. Relay 100 in operated condition is also effective for completing a circuit for operating second digit relay 420 over a circuit traced from ground through make contact 103, break off-normal contact 321 of stepping switch 32, and the upper winding of relay 420 to battery.

The operation of relay 420 is effective for completing an operating circuit for pulse relay 1000 which is traced from ground through the upper winding of relay 1000, make contacts 232 and K101, break contacts K112, D10 and K113, make contacts K102 and 234, and the lower winding of relay 1000 to battery. Relay 1000 thereupon operates and is thereafter maintained operated except during impulsing, a process to be explained presently.

The operation of relays 1000, 100, 420 and 430 is effective for completing an operating circuit for first and third digit relay 110 which is traced from ground through make contacts 103, 221 and 235, break off-normal contacts 302 of stepping switch 31, make contacts 1001, and the upper winding of relay 110 to battery. Relay 110 thereupon operates.

Means including relays 110, 420 and 430 is effective for preparing data storing means including stepping switches 31, 32, 53 and 54 to register the number of impulses in first, second, third and fourth trains, respectively, of impulses subsequently transmitted from the attendant's cabinet dial contacts D10. To this end, relays 110, 420 and 430 prepare operating circuits for the switches stepping magnets which are to be described presently.

The operation of relay 110 is effective for preparing a locking circuit for itself including make contacts 111, which are in parallel with make contacts 221 and 235 in its above-traced operating circuit. The operation of relay 110 is further effective for preparing the impulsing circuit of magnets 520 and 320 at make contacts 415.

In addition to its above-described functions, the operation of relay 420 is effective for preparing the operating circuits for magnets 300, 500 and 320 at make contacts 421. In addition to its above-described function, relay 430 in operated condition is effective for opening a start signaling circuit for the encoder transmitter at break contacts 433 and an operating circuit for restart relay 460 at break contacts 432.

*Transmitting Digits to the Termination*

The data storing means including stepping switches 31, 32, 53 and 54 are now in condition to be advanced in response to their transmission of first, second, third and fourth trains of digit impulses from dial D10.

During each of its four successive operations, the attendant's cabinet dial contacts open and reclose for each impulse in the train of impulses. The number of such openings and reclosings represent a digit whose value is stored on one of the stepping switches 31, 32, 33 and 34. Upon the transmission of an impulse train from the attendant's cabinet 10 to termination 11, impulse repeating relay 1000 is released and reoperated in response to each opening and reclosing D10 because the above-traced operating circuit of relay 1000 is opened and reclosed by each such impulse.

In response to the impulsing operation of relay 1000 during the transmission of a first train of impulses, i.e., when relays 110, 420 and 430 are operated, a circuit is closed upon each release of relay 1000 for energizing magnet 300 of stepping switch 31. The circuit is traced from ground through make contacts 401 and 415, break contacts 1002, make contacts 431, 421, 411 and 224, and the winding of magnet 300 to battery. Each energization of magnet 300 is effective for stepping wiper W31 of stepping switch 31 away from its normal position. At the conclusion of the train of impulses, W31 rests in engagement with the one of the terminals corresponding to the number of digits in the first transmitted impulse train. Auxiliary wiper W31*a* is in engagement with one of a corresponding, interconnected set of terminals for reasons to be set forth presently.

The advance of wiper W31 away from its normal position is effective for operating the off-normal means within stepping switch 31, so that the above-described energizing circuit for relay 110 is opened at break contacts 302. In order to prevent the release of relay 110 during the transmission of impulses to magnet 300, the lower winding of slow release type relay 110 is connected in parallel with magnet 300 and is therefore intermittently energized when magnet 300 is energized. Owing to the slow release nature of relay 110, relay 110 is maintained in operated condition throughout the transmission of the first train of impulses.

Subsequent to the transmission of the last impulse in the first train and the resulting reoperation of relay 1000, the holding circuit of relay 110 is opened at break contacts 1002. Relay 110 releases, opening the above-traced operating circuit for magnet 300 at make contacts 411 and 415 and preparing an energizing circuit for magnet 320 of stepping switch 32 at break contacts 412.

Upon the transmission of the second impulse train, when relays 420 and 430 are operated, each release of relay 1000 is effective for completing an energizing circuit for stepping magnet 320 which is traced from ground through make contacts 103, wiper W31*a*, break contacts 1002, make contacts 431 and 421, break contacts 412, and the winding of magnet 320 to battery. As in the case of stepping switch 31, each energization of magnet 320 is effective for advancing wiper W32 one additional step away from normal position so that wiper W32 rests in engagement with the one of the stepping switch 32 contacts corresponding to the number of impulses in the second train. Further, the advance of wiper W32 away from its normal position is effective for operating off-normal means of stepping switch 32, so that the above-traced operating circuit for relay 420 is opened at break contacts 321. Relay 420, like relay 110, is a slow release type having its lower winding connected in parallel with magnet 320. Thus, relay 420 is maintained in operated condition subsequent to the advance of wiper W32 away from its normal position even though its operating circuit is opened upon the first step taken by the switch. Following the last release and reoperation of relay 1000 during the receipt of the second impulse train, relay 420 releases to mark the end of the second impulse train.

The release of relay 420 is effective for closing a second operating circuit for relay 110 which is traced from ground through make contacts 103, break contacts 501 and 222, make contacts 301 and 1001, and the upper winding of relay 110 to battery. Relay 110 thereupon reoperates.

The release of relay 420 and the operation of relays 110 and 430 indicate the preparation of the registering means to receive the third impulse train. Thus, upon the third impulsing operation of relay 1000, a circuit is completed upon each release of relay 1000 for energizing magnet 500 of stepping switch 53 which is traced from ground through make contacts 401 and 415, break contacts 1002, make contacts 431, break contacts 422, make contacts 413, break contacts 223, and the winding of magnet 500 to battery. Each energization of magnet 500 is effective for advancing wiper W53 one additional step away from its normal position, so that wiper W53 comes to rest at the conclusion of impulsing in engagement with the one of the stepping switch 53 terminals corresponding to the number of impulses in the third impulse train. The advance of the wiper W53 away from its normal position is effective for opening the above-described operating circuit for relay 110 at make contacts 501.

In order to keep relay 110 in operated condition subsequent to the opening of contacts 501 and prior to the completion of the impulsing operation of relay 1000, the lower winding of slow release type relay 110 is connected in parallel with the winding of magnet 500. Upon the transmission of the last impulse in the third train and the subsequent reoperation of relay 1000, the above-described operating circuit for magnet 500 and energizing circuit for the lower winding of relay 110 is again opened at break contacts 1002. Relay 110 thereafter releases.

The operation of relay 420 and the release of relays 110 and 420 indicate that the termination is ready to receive the fourth and last impulse train. Upon the transmission of the fourth impulse train from dial D10 and each subsequent release of relay 1000, a circuit for energizing stepping magnet 520 of stepping switch 54 is completed from ground through make contacts 401 and 415, break contacts 1002, make contacts 431, break contacts 422 and 414 and the winding of magnet 520 to battery. As before, the wiper of stepping switch 54 is advanced one additional step away from its normal position in response to each energization of magnet 520. Therefore, wiper W54 comes to rest in engagement with the one of stepping switch 54 terminals corresponding to the number of digits in the fourth impulse train. The advance of wiper W54 away from its normal position is effective for operating the off-normal means of stepping switch 54. Therefore, the above-described operating circuit of relay 430 is opened at break contacts 522. In order to keep relay 430 from releasing subsequent to the operation of the off-normal means of stepping switch 54 and prior to the end of the fourth digit impulse train, the lower winding of slow release type relay 430 is connected in parallel to the winding of relay 520. The intermittent energization of the lower winding of relay 420 is sufficient to maintain that relay in operated condition. At the end of the fourth impulse train, and the subsequent reoperation of relay 1000, the holding circuit for relay 430 is opened at make contacts 1002. Relay 430 thereafter releases.

*Transmission of a Start Signal to the Termination*

The operation of stepping switch 54 off-normal means serves as means for indicating that a series of signals has been stored on each of stepping switches 31, 32, 53 and 54. Accordingly, the operation of off-normal springs 521 on stepping switch 54 is effective for preparing an operating circuit for start relay 570 at make contacts 521. This same circuit is further prepared by the release of relay 430 at break contacts 432.

This release of relay 430 is effective for transferring conductors T10 and R10 of trunk line TRK10 from the above-described connection to the windings of relay 1000 at make contacts 232 and 234 into connection with the winding of relay 240 by way of blocking capacitor C21 at break contacts 231 and 233. Thereafter relay 240 responds over an obvious operating circuit when the ringing generator key K11 is operated to connect the ringing generator to conductors T10 and R10. Relay 240 in operated condition is effective in response to the operation of make contacts 521 and the release of relay 430 for completing the operating circuit for start relay 570 which is traced from ground through make contacts 103, 521 and 441, break contacts 332, 462 and 452, and the upper winding of relay 570 to battery. Relay 570 thereupon operates and closes an obvious locking circuit for itself at make contacts 572.

The operation of relay 570 is effective for opening the operating circuit of restart relay 460 at break contacts 571. The operation of relay 570 is further effective for completing an operating circuit for peg count meter 540 at make contacts 576. The operation of relay 570 is further effective for putting an alternate energizing battery connection on busy lamp L10 at make contacts 271. The operation of relay 570 is further effective for removing ground from conductor SY37 at break contacts 272 for reasons to be explained presently.

The operation of relay 570 is further effective for completing an obvious energizing circuit for time delay relay 250 at make contacts 273. Relay 250 thereupon operates and is effective for opening the above-traced operating circuit of relay 570 at break contacts 452 and for preparing an operating circuit for restart relay 460 at make contacts 451. The operation of relay 570 is effective for transmitting a start signal to start means including cycle relay 390 within encoder transmitter 30. The circuit is traced from ground through break contacts 433, make contacts 573, conductor start 50, and the winding of relay 390 to battery. Relay 390 thereupon operates.

The operation of relay 570 is further effective for connecting its own lower winding to conductor stop 50 at make contacts 575 in order to prepare data storage termination 11 to receive a dismiss signal from encoder transmitter 30. The operation of relay 570 is further effective for opening circuits for energizing release magnets 310, 330, 510 and 530 of stepping switches 31, 32, 53 and 54 at break contacts 274 in order to prevent the stepping switches from being released at this time.

*Readout to and Operation of the Encoder Transmitter*

Upon the transmission of a start signal to encoder transmitter 30, the above-described operation of relay 390 is effective for causing the termination stepping switches to spill their stored information into encoder transmitter 30. Because encoder transmitter 30, as such, does not form a part of the present invention, its operation is described only in detail sufficient to support the description of the data storage termination. In addition to the aforementioned cycle relay 390, encoder transmitter 30 includes scanning switch 35, impulsing means comprising make contacts 362, release means comprising make contacts 361, stop means comprising make contacts 34 and transmitter 33.

Within encoder transmitter 30 impulsing means (not shown) is operative in response to the operation of relay 390 for closing and reopening make contacts 362 four successive times. Contacts 362 in closed condition are effective for completing an obvious circuit for energizing the stepping magnet 350 of scanning switch 35, so that wiper W35 of switch 35 is advanced away from its normal position and into successive engagement with its first, second, third and fourth terminals upon corresponding operations of contacts 362. The operation of relay 390 is also effective for closing for itself an obvious locking circuit including make contacts 395.

At this point, it is noted that the corresponding terminals of stepping switches 31, 32, 53 and 54 are connected to each other. Further, the terminals are connected by conductors shown collectively as input 38 to transmitter 33. The wipers W31, W32, W53 and W54 of stepping switches 31—54 are connected to the first, second, third and fourth terminals of scanning switch 35. With the above-described arrangement of apparatus within encoder transmitter 33, it is seen that a ground signal from contacts 392 is placed on the particular one of input 38 conductors in accordance with the setting of each one of switches 31, 32, 53 and 54 as scanning switch 35 is advanced from its normal to fourth operated position.

The four energizations of the ones of conductors of input 38 resulting from the scanning of switches 31—54 is effective for selectively operating transmitter 33. Upon the operation of transmitter 33, means (not shown) within transmitter 33 is operated and is thereupon effective to close and reopen release contacts 361 and end of cycle contacts 34 in the order named. The closing of contacts 361 is effective for completing an obvious circuit for energizing release magnet 340 of scanning switch 35, so that the wiper W35 of that switch is returned to normal. The closing of contacts 34 is effective for applying a ground signal to conductor stop 50, which is transmitted to data storing termination 11 with effects to be described presently.

At the same time contacts 34 are reopened, break contacts 36 are opened momentarily and then reclosed. By this means, the aforementioned locking circuit for relay 390 is opened, so that relay 390 releases at this time. The release of relay 390 and the reopening of contacts 34 indicates that encoder transmitter 30 is in normal condition. Thereafter encoder transmitter 30 is prepared to respond again in the above-described manner to a ground signal received over conductor start 50.

*Stopping the Readout Operation Within the Data Storage Termination*

The receipt of a ground signal from conductor stop 50 is effective for releasing start relay 570 within termination 11 because conductor stop 50 is connected to the lower winding of relay 570 through make contacts 575 and the upper and lower windings of relay 570 are now differentially energized. The release of relay 570 is effective for preparing an operating circuit for relay 460 at break contacts 571. The release of relay 570 is further effective for opening its own locking circuit at make contacts 572. The release of relay 570 is further effective for removing the battery connection to the busy indicating lamp L10 at make contacts 271. Lamp L10, however, remains energized owing to the fact that battery is still connected thereto at the make contacts 101 of sleeve relay 100. Release of relay 570 is further effective for opening the aforementioned operating circuit of relay 250 at make contacts 273. Upon the release of relay 570, data storage termination is in condition to receive another scanning start signal from attendant cabinet 10 or to be released.

*Resignalling From the Attendant's Cabinet*

From the above description, it is obvious that the complete operation of encoder transmitter 30 requires a finite time interval following the transmission of a start signal over conductor start 50. For this reason, and because it is desirable to make successive cyclical operations of the encoder transmitter spaced apart from each other by a minimum time interval, time delay relay 250 is provided for this purpose. Relay 250 is effective in its operated condition to open the operating circuit of relay 570, as previously described.

Upon the release of relay 570, relay 250 is free to release. At this time it is pointed out that the operation of relay 570 is effective for closing a circuit to charge battery-connected capacitor C31 through resistor R31 at make contacts 273. Capacitor C31 is connected in parallel to the windings of relay 250, so that the positive charge stored therein is dissipated through resistor R31 and the winding of relay 250 following the opening of make contacts 273 upon the release of relay 570. The values of capacitor C31 and R31 are chosen so that the release of relay 250 is delayed for the minimum time interval required between the transmission of successive ground signals over conductor start 50 to encoder transmitter 30.

Assuming that further transmission of start signals from key K11 at attendant's cabinet 10 are delayed until after relay 250 has released, operation of key K11 at attendant cabinet 10 is effective for reoperating relay 240. Consequently, relay 570 operates to make that encoder transmitter 30 operative in the above-described manner.

In the event that key K11 at attendant cabinet 10 is operated prior to the release of relay 250, the reoperation of relay 240 is effective for operating means comprising restart relay 460 for storing the start signal until relay 250 releases. The circuit for operating restart relay 460 is traced from ground through make contacts 103, 521 and 441, break contacts 432 and 462, make contacts 451, break contacts 571, and the winding of relay 460 to battery and is completed by the operation of relay 240 at make contacts 241. Relay 460 thereupon operates, closing a locking circuit for itself traced from ground through make contacts 463 and 451, break contacts 571, and the winding of relay 460 to battery. The operation of relay 460 is also effective for opening the above-traced operating circuit for that relay at break contacts 462.

Upon the subsequent release of relay 250, the operation of relay 460 is effective for closing an operating circuit for start relay 570 which is traced from ground through make contacts 463, break contacts 452, and the upper winding of relay 570 to battery. Relay 570 thereupon operates and is effective in the previously described manner for restarting the encoder transmitter 30. Encoder transmitter 30 operates to retransmit a signal from transmitter 33 and to signal termination 11 at the end of its cycle of operations in the previously described manner.

In either of the above-described manners, encoder transmitter 30 can be reoperated as many times as the attendant reoperates key K11.

*Release of the Termination*

After the attendant at cabinet 10 has caused encoder transmitter 30 to transmit the desired number of signals, the attendant disconnects the cabinet equipment including dial D10 and key K11 from and releases termination 11 for reuse by restoring key K10 to its normal position. The release of key K10 is effective for restoring termination 11 to its normal condition, but only after a complete operation of encoder transmitter 30 has been effected.

If it is assumed that encoder transmitter 30 has transmitted its stop signal and that start relay 570 is released before key K10 is restored, the restoration of key K10 is effective for releasing termination 11 immediately, so that the termination may be seized from any attendant's cabinet having access to the termination. The release of key K10 opens the above-traced operating circuit of relay 100 at make contacts K103. Relay 100 thereupon releases.

The release of relay 100 is further effective for opening the above-traced circuits for energizing relays 110, 420, 430, 460 and 570 at make contacts 103. The release of relays 100, 460 and 570 is effective for restoring stepping switches 31, 32, 53 and 54 by closing circuits for energizing release magnets 310, 330, 510 and 530 individual to the stepping switches. The energizing circuit is traced from ground through break contacts 102, 261, 274, and the off-normal contacts 303, 322, 503 and 523 of each of the switches.

The release of relay 100 is effective for opening at contacts 101 the energizing circuit for busy lamps such as L10 at all attendant cabinets in order to indicate to the attendant's cabinets that the equipment is in idle condition and available for use. The release of relay 100 is further effective for opening the above-traced circuit for energizing magnet 300 of stepping switch 31 at make contacts 401.

In the event that the attendant at cabinet 10 releases key K10 prior to a complete cyclical operation of encoder transmitter 30, relay 570 is maintained in its operated condition until the encoder transmitter sends a stop signal thereto. Until encoder transmitter 30 has completely operated, it is necessary to maintain busy indicating means such as L20 in operated condition. For this reason, relay 570 is effective for applying battery to the busy lamp at make contacts 271.

Further, the operation of either relay 570 or 460 is effective at this time for opening at break contacts 274 or 261 the above-described energizing circuit for the release magnet of stepping switches 31, 32, 53 and 54 in order to insure that the stepping switches are maintained in their operated positions until the cyclical operation of encoder transmitter 30 has been completed. Upon the completion of encoder transmitter 30's operation and the resulting release of relay 570, the busy indicating means including lamp L10 is deenergized. The subsequent release of relay 460 is effective in response to the release of relay 100 for completing the above-described energizing circuit for release magnets 310, 330, 510 and 530 at break contacts 261, so that switches 31, 32, 53 and 54 are thereupon restored to normal.

*Alarm Condition in the Encoder Transmitter*

Returning to that point in the description where a stop signal has been sent from encoder transmitter 30 to termination 11, if encoder transmitter 30 should fail fully to operate and therefore continue to hold relay 390 in operated condition, I provide means including busy relay 280 for maintaining the busy indicating battery on lamps such as L10 in each attendant cabinet. Relay 280 is maintained operated when encoder transmitter 30 and data storage termination are in idle condition by means including break contacts 391 and 272 on relays 390 and 570, respectively. Relay 280 in operated condition is effective for withholding the battery supply from busy indicating lamp L10 at break contacts 281, so that lamp L10 is not energized when termination 11 and encoder transmitter 30 are in normal condition.

When termination 11 and encoder transmitter 30 are taken for use, the operating circuit of relay 280 is opened at break contacts 272 and 391, as a result of the normal operation of relays 570 and 390, respectively. The release of relay 280 supplies battery to lamp L10 at contacts 281, which are in parallel with now-operated contacts 101 and 271 on relays 100 and 570, respectively.

Assuming that relay 390 is maintained operated after relay 570 has released in response to the receipt of a stop signal from encoder transmitter 30 and the attendant at the cabinet has withdrawn from the connection with the resulting release of relay 100, relay 280 continues to be maintained in its released condition by virtue of the fact that its operating circuit is held open at break contacts 391. Under these conditions, the busy indicating lamps such as L10 are energized from battery supplied through the contacts 281 only. Under these conditions, lamps such as L10 are maintained energized to inform attendants that the termination 11 and encoder transmitter 30 are not available for use.

When the alarm condition is cleared from the equipment and relay 390 releases, relay 280 reoperates, extinguishing lamps such as L10. Thereafter, attendants at the various positions are free to use termination and encoder transmitter 30 in the above-described manner.

While I have shown and described a specific embodiment of my invention, other modifications will readily occur to those skilled in the art. I do not, therefore, desire my invention to be limited to the specific arrangement shown and described and I intend to cover all modifications with the scope and spirit of my invention in the appended claims.

What I claim is:

1. In a data transmission system, an attendant cabinet including a dial for producing impulse trains and other means for producing signals, a trunk extending from said cabinet to a data storage termination, said termination including first and second relays operative for repeating trains of impulses transmitted from said dial and signals transmitted from said other means, respectively, seizure means operative for connecting said dial and said other signaling means to said first and said second relays, respectively, by way of said trunk, storage means including a plurality of stepping switches for registering the number of impulses in each of a succession of impulse trains generated by said dial, each of said switches being advanced in response to the impulsing operation of said first relay to a position corresponding to the number of impulses in the corresponding impulse train, means including a broadcast transmitter for sending selective signals over a communication medium, means operative to scan each of said switches in a predetermined order for transmitting directive signals to said broadcast transmitter in accordance with the operated positions of said switches, starting means including a third relay operative in response to the operation of said switches and to the operation of said second relay for making said scanning means operative, means for thereafter holding said third relay in operated condition, and means operative in response to the operation of said scanning means for restoring said third relay to normal condition, whereby said broadcast transmitter is directively operated in response to each of a succession of operations of said other signal producing means after said switches have been set in response to signals transmitted from said dial.

2. In a data transmission system, an attendant cabinet including a dial for producing impulse trains, a source of ringing voltage, and a first key connected to said ringing source manually operative for producing ringing voltage signals, a data storage termination, a trunk extending between said cabinet and said termination, a second key in said attendant cabinet for connecting said dial and said first key to said trunk, first and second relays in said termination for repeating signals from said dial and said key, respectively, manually operative means in said cabinet for connecting said dial and said key to said trunk, seizure means including a third relay in said termination operative in response to the operation of said manually operative connecting means for connecting said first relay to said trunk and normally effective for connecting said second relay to said trunk, means including a plurality of stepping switches for registering the number of impulses in each of a corresponding number of impulsing operations of said first relay in order to record the value of successive impulse trains transmitted to said termination from said dial, said seizure means also being effective for making said switches operative in a predetermined order, means effective in response to the operation of all of said switches for restoring said third relay to normal condition in order to connect said trunk to said second relay and to disconnect said first relay from said trunk, a broadcast transmitter directively operative for broadcasting signals over a communication medium, an encoder operative for scanning said switches and transmitting data stored therein to said transmitter in order to directively operate said transmitter, means including a start relay operative in response to the operation of said second relay for causing said encoder to become operative, means for maintaining said start relay in operated condition, and means operative in response to a single scanning operation of said encoder for releasing said start relay, whereby successive operations of said broadcast transmitter result from each operation of said signal transmitting key after a succession of operations of said dial.

3. The data transmission system set forth in claim 2 and having in addition delay means including a fourth relay operative in response to the operation of said start relay for making said second relay ineffective with respect to said starting means, and means for maintaining said fourth relay in operated condition for a predetermined time interval following the restoration of said start relay to normal condition, whereby successive operations of said broadcast transmitter are spaced apart from each other by the time interval required to release said fourth relay.

4. The data transmission system set forth in claim 2 and having in addition a fifth relay operative in response to the operation of said second and said fourth relays for registering the operation of said second relay during the time interval said starting means is in operated condition, means responsive to the operation of said fourth relay for maintaining said fifth relay in operated condition, and means including said fifth relay operative in response to the release of said fourth relay to normal condition for operating said starting means, whereby transmission of the second of two successive signals from said other signaling means to said termination prior to the restoration of said delay means to normal condition is effective to bring about a second operation of said broadcast transmitter upon the release of said fourth relay.

References Cited in the file of this patent

UNITED STATES PATENTS

| | | |
|---|---|---|
| 2,442,603 | Jackel | June 1, 1948 |
| 2,453,871 | Spencer | Nov. 16, 1948 |
| 2,706,215 | Van Duuren | Apr. 12, 1955 |
| 2,817,828 | McGuigan et al. | Dec. 24, 1957 |
| 2,869,046 | Boyer | Apr. 17, 1959 |